United States Patent
Sayenko et al.

(10) Patent No.: US 10,177,891 B2
(45) Date of Patent: Jan. 8, 2019

(54) METHOD AND APPARATUS FOR NON-ADJACENT CARRIER SIGNALING IN A MULTICARRIER BROADBAND WIRELESS SYSTEM

(75) Inventors: Alexander Sayenko, Espoo (FI); Keiichi Kubota, Weybridge (GB)

(73) Assignee: Nokia Solutions and Networks Oy, Espoo (FI)

( * ) Notice: Subject to any disclaimer, the term of this patent is extended or adjusted under 35 U.S.C. 154(b) by 126 days.

(21) Appl. No.: 13/979,183

(22) PCT Filed: Jan. 11, 2011

(86) PCT No.: PCT/IB2011/050123
§ 371 (c)(1),
(2), (4) Date: Sep. 26, 2013

(87) PCT Pub. No.: WO2012/095699
PCT Pub. Date: Jul. 19, 2012

(65) Prior Publication Data
US 2014/0016587 A1 Jan. 16, 2014

(51) Int. Cl.
*H04L 5/00* (2006.01)
*H04L 27/26* (2006.01)
*H04W 72/04* (2009.01)
*H04W 88/06* (2009.01)

(52) U.S. Cl.
CPC ........ *H04L 5/0094* (2013.01); *H04L 5/0044* (2013.01); *H04W 72/048* (2013.01); *H04L 27/2601* (2013.01); *H04W 88/06* (2013.01)

(58) Field of Classification Search
CPC ... H04W 72/048; H04L 5/0094; H04L 5/0044
See application file for complete search history.

(56) References Cited

U.S. PATENT DOCUMENTS

| | | | |
|---|---|---|---|
| 8,320,276 B1 * | 11/2012 | Callender | H04L 5/001 370/236 |
| 2003/0147655 A1 | 8/2003 | Shattil | 398/182 |
| 2005/0111346 A1 | 5/2005 | Santhoff et al. | 370/203 |

(Continued)

FOREIGN PATENT DOCUMENTS

| CN | 101350941 A | 1/2009 |
|---|---|---|
| CN | 101730981 A | 6/2010 |

(Continued)

OTHER PUBLICATIONS

R2-106411; Nokia Siemens Networks, Nokia Corporation; "UE capability signaling for CA and MIMO in REL 10"; 3GPP TSG-RAN WG2 Meeting #72; Jacksonville, USA, Nov. 15-19, 2010; pp. 12.

(Continued)

*Primary Examiner* — Omar S Mian
(74) *Attorney, Agent, or Firm* — Harrington & Smith (57) ABSTRACT

In accordance with an example embodiment of the present invention, an apparatus including at least one processor, and at least one memory including computer program code, wherein the at least one memory and the computer program code are configured to, with the at least one processor, cause the apparatus to perform at least the following report a maximum supported radio frequency bandwidth, report a number of supported carriers, and receive data on non-adjacent carriers.

21 Claims, 2 Drawing Sheets

(56) References Cited

U.S. PATENT DOCUMENTS

| | | | |
|---|---|---|---|
| 2008/0240275 A1 | 10/2008 | Cai | |
| 2010/0182972 A1* | 7/2010 | Katayama | H04W 72/048 370/329 |
| 2010/0272051 A1* | 10/2010 | Fu | H04L 5/0037 370/329 |
| 2012/0033570 A1* | 2/2012 | He | H04L 5/001 370/252 |
| 2012/0113935 A1* | 5/2012 | Lindoff | H04W 28/04 370/329 |
| 2012/0155407 A1* | 6/2012 | Lindoff | H04L 5/001 370/329 |
| 2012/0224552 A1* | 9/2012 | Feuersanger | H04L 5/0007 370/329 |
| 2012/0275413 A1* | 11/2012 | Hong | H04L 5/0041 370/329 |
| 2013/0136069 A1* | 5/2013 | Baldemair | H04L 5/001 370/329 |

FOREIGN PATENT DOCUMENTS

| | | |
|---|---|---|
| CN | 101778393 A | 7/2010 |
| CN | 101483914 B | 12/2010 |
| EP | 2 271 011 A1 | 1/2011 |
| JP | 2013/519950 A | 5/2013 |

OTHER PUBLICATIONS

3GPP TR 36.807 V1.1.0 (Nov. 2010); "3$^{rd}$ Generation Partnership Project; Technical Specification Group Radio Access Network; Evolved Universal Terrestrial Radio Access (E-UTRA); User Equipment (UE) radio transmission and reception; (Release 10)"; R4-105026; Nov. 2010; whole document (55 pages).

IEEE Std 802.11g-2003 (Amendment to IEEE Std 802.11, 1999 Edition); "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 4: Further Higher Data Rate Extension in the 2.4 GHz Band"; Jun. 27, 2003; whole document (78 pages).

IEEE Std 802.15.1-2005 (Revision of IEEE Std 802.15.1-2002); "IEEE Standard for Information technology—Telecommunications and information exchange between systems—Local and metropolitan area networks—Specific requirements; Part 15.1: Wireless medium access control (MAC) and physical layer (PHY) specifications for wireless personal area networks (WPANs)"; Jun. 14, 2005; whole document (600 pages).

3GPP TSG-RAN WG2 #70, Apr. 10-May 14, 2010, Montreal, Canada, R2-103219, "Signaling and support of band combinations of 4C-HSDPA", Qualcomm Inc., 5 pgs.

3GPP TSG-RAN WG4 Meeting #57, Jacksonville, United States of America, Nov. 15-19, 2010, R4-104313, "Considerations on release 10 UE categories", Nokia et al., 4 pgs.

3GPP TR 36.808 V1.0.0 (Dec. 2010), "3$^{rd}$ Generation Partnership Project; Technical Specification Group Radio Access network; Evolved Universal Terrestrial Radio Access (E-UTRA); Carrier Aggregation; Base Station (BS) radio transmission and reception (Release 10)", 102 pgs.

Yuan, Guangxiang, "Carrier Aggregation for LTE-Advanced Mobile Communication Systems", © 2010 IEEE, 6 pgs.

R2-106892, "UE capability signaling for CA and MIMO in REL10", 3GPP TSG-RAN WG2 Meeting #72, Nokia Siemens Networks, et al., Nov. 2010, 11 pgs.

R4-103607, "Further discussion on UE categories and capabilities", 3GPP TSG-RAN WG4 Meeting Ad Hoc #4, HiSilicon, et al., Oct. 2010, 5 pgs.

R4-105026, "3$^{rd}$ Generation Partnership Project; Technical Specification Group Radio Access Network; Evolved Universal Terrestrial Radio Access (E-UTRA); User Equipment (UE) radio transmission and reception; (Release 10)", 3GPP TR 36.807 V1.1.0, Nov. 2010, 55 pgs.

\* cited by examiner

15 MHz MAXIMUM SUPPORTED BANDWIDTH
AND TWO NON-ADJACENT CARRIERS

*FIG. 3*

20 MHz MAXIMUM SUPPORTED BANDWIDTH
AND TWO NON-ADJACENT CARRIERS

METHOD AND APPARATUS FOR NON-ADJACENT CARRIER SIGNALING IN A MULTICARRIER BROADBAND WIRELESS SYSTEM

TECHNICAL FIELD

The present application relates generally to non-adjacent carrier signaling in a multi-carrier broadband wireless system.

BACKGROUND

As wireless communication devices flourish, there is a need for higher data rates and spectral efficiency. Multi-carrier systems, where carriers may reside in a single or different bands, can provide higher data rates in wireless communications systems, and have been playing a significant role in a wide variety of wireless standards. In multi-carrier systems, the carriers may be adjacent to each other, or they may be non-adjacent to each other. Non-adjacent carrier allocation means there are frequency gaps among the carriers. Non-adjacent carrier operation may help to increase the data rate in various situations. For example, when operators have scattered spectrum in a single band, or when dynamic spectrum allocation comes into play.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: report a maximum supported radio frequency bandwidth; report a number of supported carriers; and receive data on non-adjacent carriers.

According to a second aspect of the present invention, a method comprising: reporting a maximum supported radio frequency bandwidth; reporting a number of supported carriers; and receiving data on non-adjacent carriers.

According to a third aspect of the present invention, a computer program product comprising : a computer-readable medium bearing computer program code embodied therein for use with a computer, the computer program code comprising: code for reporting a maximum supported radio frequency bandwidth; code for reporting a number of supported carriers; and code for receiving data on non-adjacent carriers.

According to a fourth aspect of the present invention, an apparatus comprising: at least one processor; and at least one memory including computer program code, wherein the at least one memory and the computer program code are configured to, with the at least one processor, cause the apparatus to perform at least the following: receive a maximum supported radio frequency bandwidth; receive a number of supported carriers; and allocate data on non-adjacent carriers, wherein the non-adjacent carriers are determined based at least in part on the received maximum supported radio frequency bandwidth and the received number of supported carriers.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Figure 1:
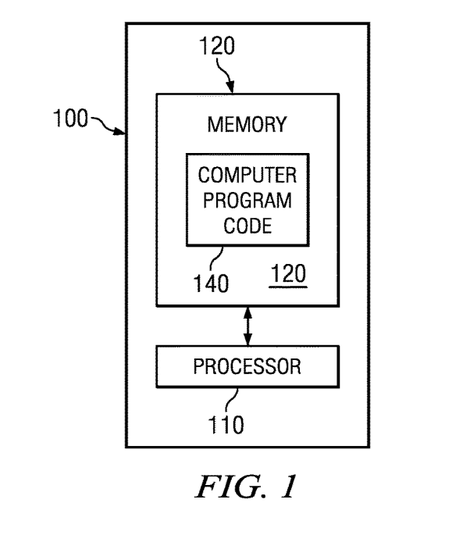
FIG. 1 is a block diagram depicting an electronic device operating in accordance with an example embodiment of the invention.

FIG. 1 is a block diagram depicting an electronic device 100 operating in accordance with an example embodiment of the invention. In an example embodiment, the electronic device 100 comprises a processor 110 or other processing component. In an example embodiment, the electronic device 100 may comprise multiple processors, such as processor 110.

In an embodiment, the electronic device 100 comprises memory 120. For example, the electronic device may comprise volatile memory, such as random access memory, RAM. Volatile memory may comprise a cache area for the temporary storage of data. Further, the electronic device 100 may also comprise non-volatile memory, which may be embedded and/or may be removable. The non-volatile memory may also comprise an electrically erasable programmable read only memory, flash memory, and/or the like. In an alternative embodiment, the processor 110 may comprise memory. For example, the processor 110 may comprise volatile memory, non-volatile memory, and/or the like.

The electronic device 100 may use at least one memory to store one or more computer program code 140. In accordance with computer program code 140, the processor 110 may perform embodiments of the present invention, or cause electronic device 100 to perform embodiments of the invention.

The electronic device 100 may have a transmitter and a receiver. In an example embodiment, the transmitter and receiver are separated. In an alternative embodiment, the transmitter and receiver are combined. The receiver has a maximum radio frequency bandwidth it can receive data from. By maximum radio frequency bandwidth it is meant a maximum width of a frequency band comprising carriers and gaps between the carriers.

In an embodiment, the processor 110 of the electronic device 100 may comprise circuitry for implementing audio feature, logic features, and/or the like. For example, the processor 110 may comprise a digital signal processor device, a microprocessor device, a processing core, a digital to analog converter, other support circuits, and/or the like. In an embodiment, control and signal processing features of the processor 110 may be allocated between devices, such as the devices describe above, according to their respective capabilities. Further, the processor 110 may also comprise an internal voice coder and/or an internal data modem. Further still, the processor 110 may comprise features to operate one or more software programs. For example, the processor 110 may be capable of operating a software program for connectivity, such as a conventional Internet browser. Further, the connectivity program may allow the electronic device 100 to transmit and receive Internet content, such as location-based content, other web page content, and/or the like. In an embodiment, the electronic device 100 may use a wireless application protocol, WAP, hypertext transfer protocol, HTTP, file transfer protocol, FTP, and/or the like to transmit and/or receive the Internet content.

In an embodiment, the electronic device 100 may be capable of operating in accordance with any of a number of a first generation communication protocol, a second generation communication protocol, a third generation communication protocol, a fourth generation communication protocol, and/or the like. For example, the electronic device 100 may be capable of operating in accordance with second generation, 2G, communication protocols IS-136, time division multiple access, TDMA, global system for mobile communication, GSM, IS-95 code division multiple access, CDMA, and/or the like. Further, the electronic device 100 may be capable of operating in accordance with third-generation, 3G, communication protocols, such as Universal Mobile Telecommunications System, UNITS, CDMA2000, wideband CDMA, WCDMA, time division-synchronous CDMA, TD-SCDMA, and/or the like. Further still, the electronic device 100 may also be capable of operating in accordance with 3.9 generation, 3.9G, wireless communication protocols, such as Evolved Universal Terrestrial Radio Access Network, E-UTRAN, or the like, or wireless communication projects, such as long term evolution, LTE, or the like. Still further, the electronic device 100 may be capable of operating in accordance with fourth generation, 4G communication protocols.

In an alternative embodiment, the electronic device 100 may be capable of operating in accordance with a non-cellular communication mechanism. For example, the electronic device 100 may be capable of communication in a wireless local area network, WLAN, other communication networks, and/or the like. Further, the electronic device 100 may communicate in accordance with techniques, such as radio frequency, RF, infrared, IrDA, any of a number of WLAN techniques. For example, the electronic device 100 may communicate using one or more of the following WLAN techniques: IEEE 802.11, e.g., 802.11a, 802.11b, 802.11g, 802.11n, and/or the like. Further, the electronic device 100 may also communicate, via a world interoperability, to use a microwave access, WiMAX technique, such as IEEE 802.16, and/or a wireless personal area network, WPAN technique, such as IEEE 802.15, BlueTooth, BT, ultra wideband, UWB, and/or the like. It should be understood that the communications protocols described above may employ the use of signals. In an example embodiment, the signals comprises signaling information in accordance with the air interface standard of the applicable cellular or non-cellular system, user speech, received data, user generated data, and/or the like. In an embodiment, the electronic device 100 may be capable of operating with one or more air interface standards, communication protocols, modulation types, access types, and/or the like. It should be further understood that the electronic device 100 is merely illustrative of one type of electronic device that would benefit from embodiments of the invention and, therefore, should not be taken to limit the scope of embodiments of the invention.

While embodiments of the electronic device 100 are illustrated and will be hereinafter described for purposes of example, other types of electronic devices, such as a portable digital assistant, PDA, a pager, a mobile television, a gaming device, a camera, a video recorder, an audio player, a video player, a radio, a mobile telephone, a traditional computer, a portable computer device, a global positioning system, GPS, device, a GPS navigation device, a GPS system, a mobile computer, a browsing device, an electronic book reader, a combination thereof, and/or the like, may be used. While several embodiments of the invention may be performed or used by the electronic device 100, embodiments may also be employed by a server, a service, a combination thereof, and/or the like.

Figure 2:
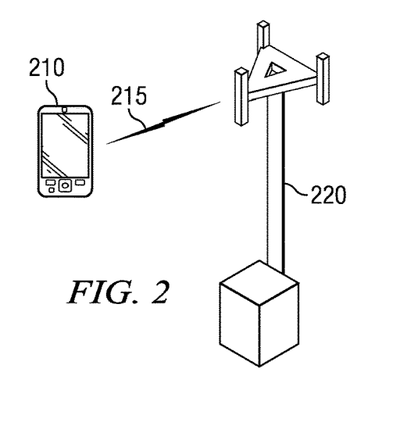
FIG. 2 illustrates an arrangement where some embodiments of the invention may be practiced.

FIG. 2 illustrates an arrangement where some embodiments of the invention may be practiced. FIG. 2 illustrates apparatus 210. Example of apparatus 210 may be an electronic device, such as electronic device 100 of FIG. 1.

Connection 215 allows apparatus 210 to transmit information to base station 220. Connection 215 may also allow apparatus 210 to receive information from base station 220. Connection 215 may be a connection according to wideband code division multiple access, WCDMA, global system for mobile communications, GSM, long term evolution, LTE, or other wireless technology. In some embodiments connection 215 may be a wire-line connection instead of a wireless connection. Connection 215 may comprise an uplink connection for conveying information from apparatus 210 to base station 220. Connection 215 may comprise a downlink for conveying information from base station 220 to apparatus 210. Base station 220 comprises equipment configured to support connection 215, for example in embodiments where connection 215 is in accordance with WCDMA technology, base station 220 comprises at least equipment arranged to support WCDMA connections. Base station 220 is herein referred to as a base station, but is should be understood that in some embodiments, other terms such as access point 220 might be considered more accurate and such embodiments are not to be excluded from the scope of the present invention by this terminological choice.

Connection 215 may comprise resources reserved for the connection. Radio resources of a wireless connection 215 may comprise at least one of frequency, time, code or space resources, for example. Resources reserved for connection 215 may comprise a certain time-slice on a certain spreading code, which is used to spread a signal over a certain frequency band. In embodiments where connection 215 is wire-line, resources of the connection may comprise timeslots allocated to connection 215. Connection 215 may comprise encryption, authentication and charging aspects handled by the system in which base station 220 is comprised.

Catering for higher data rates, some wireless broadband access systems have introduced a concept of multi-carrier system, where carriers may reside in a single or different frequency band. For example in embodiments where connection 215 is in accordance with WCDMA technology, $3^{rd}$ generation partnership project, 3GPP, specifies the operating bands for full duplex division, FDD, operation. In the example embodiment of WCDMA technology, each carrier has a 5 MHz bandwidth. For operating band I, the bandwidth of downlink, DL, frequency is 2170-2110=60 MHz. Hence in operating band I there are 60 MHz/5 MHz=12 multiple carriers for downlink data transmissions. The operating band allocation is merely illustrative of one type of allocations that may be used for WCDMA technology and, therefore, should not be taken to limit the scope of embodiments of the invention. Other operating band allocations may be possible for other technologies, such as LTE or LTE-Advanced.

TABLE 1

An example of operating band allocations for WCDMA technology

| Operating Band | UL Frequencies UE transmit, Node B receive | DL frequencies UE receive, Node B transmit |
| --- | --- | --- |
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |
| VII | 2500-2570 MHz | 2620-2690 MHz |
| VIII | 880-915 MHz | 925-960 MHz |
| IX | 1749.9-1784.9 MHz | 1844.9-1879.9 MHz |
| X | 1710-1770 MHz | 2110-2170 MHz |
| XI | 1427.9-1447.9 MHz | 1475.9-1495.9 MHz |
| XII | 698-716 MHz | 728-746 MHz |
| XIII | 777-787 MHz | 746-756 MHz |
| XIV | 788-798 MHz | 758-768 MHz |
| XV | Reserved | Reserved |
| XVI | Reserved | Reserved |
| XVII | Reserved | Reserved |
| XVIII | Reserved | Reserved |
| XIX | 830-845 MHz | 875-890 MHz |
| XX | 832-862 MHz | 791-821 MHz |
| XXI | 1447.9-1462.9 MHz | 1495.9-1510.9 MHz |

The multi-carriers available to apparatus 210 may not always be adjacent. Depending on the maximum radio frequency bandwidth and/or the maximum gap between non-adjacent carriers, and the number of carriers apparatus 210 may support, the base station 220 may allocate non-adjacent carriers to apparatus 210. FIG. 3 to FIG. 6 provide some examples of non-adjacent carrier allocation.

Figure 3:
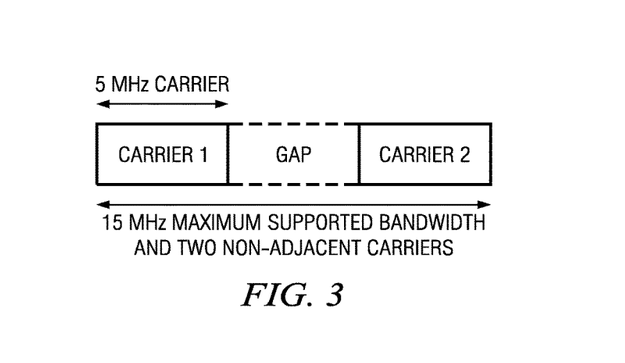
FIG. 3 is a block diagram illustrating an allocation of two non-adjacent carriers for an apparatus with 15MHz maximum supported radio frequency bandwidth operating in accordance with an example embodiment of the invention.

FIG. 3 is a block diagram illustrating an allocation of two non-adjacent carriers for an apparatus with 15 MHz maximum supported radio frequency bandwidth and 5 MHz carrier bandwidth operating in accordance with an example embodiment of the invention. An example of the apparatus may be an electronic device, such as electronic device 100 of FIG. 1. In this example embodiment, the maximum gap size between non-adjacent carriers—carrier 1 and carrier 2, is 5 MHz.

Figure 4:
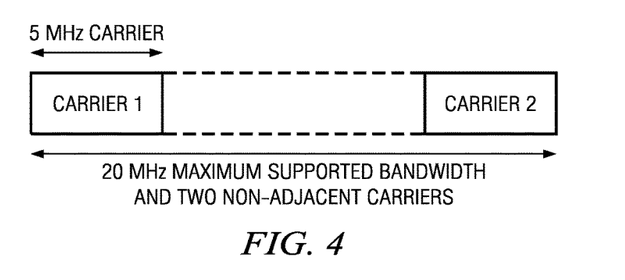
FIG. 4 is a block diagram illustrating an allocation of two non-adjacent carriers for an apparatus with 20 MHz maximum supported radio frequency bandwidth operating in accordance with an example embodiment of the invention.

FIG. 4 is a block diagram illustrating an allocation of two non-adjacent carriers for an apparatus with 20 MHz maximum supported radio frequency bandwidth and 5 MHz carrier bandwidth operating in accordance with an example embodiment of the invention. An example of the apparatus may be an electronic device, such as electronic device 100 of FIG. 1. In this example embodiment, the maximum gap size between non-adjacent carriers—carrier 1 and carrier 2, is 10 MHz.

Figure 5:
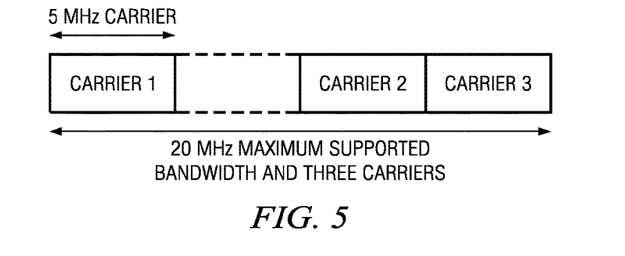
FIG. 5 is a block diagram illustrating an allocation of three carriers for an apparatus with 20 MHz maximum supported radio frequency bandwidth operating in accordance with an example embodiment of the invention.

FIG. 5 is a block diagram illustrating an allocation of three carriers for an apparatus with 20 MHz maximum supported radio frequency bandwidth and 5 MHz carrier bandwidth operating in accordance with an example embodiment of the invention. An example of the apparatus may be an electronic device, such as electronic device 100 of FIG. 1. In this example embodiment, the maximum gap size between any of the non-adjacent carriers is 5 MHz.

Figure 6:
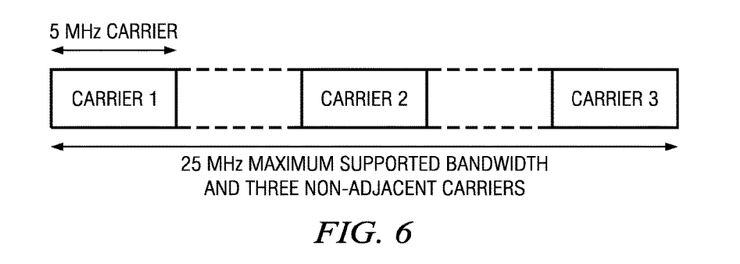
FIG. 6 is a block diagram illustrating an allocation of three non-adjacent carriers for an apparatus with 25 MHz maximum supported radio frequency bandwidth operating in accordance with an example embodiment of the invention.

FIG. 6 is a block diagram illustrating an allocation of three non-adjacent carriers for an apparatus with 25 MHz maximum supported radio frequency bandwidth and 5 MHz carrier bandwidth operating in accordance with an example embodiment of the invention. An example of the apparatus may be an electronic device, such as electronic device 100 of FIG. 1. In this example embodiment, the maximum gap size between any of the non-adjacent carriers is 5 MHz.

In the example embodiments of FIG. 3-6, the carrier bandwidth is 5 MHz. The 5 MHz carrier bandwidth is merely illustrative of one type of allocations, and, therefore, should not be taken to limit the scope of embodiments of the invention. Other carrier bandwidth may be possible. The carrier bandwidth may be a fixed value or variant. For example, when the carrier bandwidths are variant, different carriers may have different carrier bandwidth values.

Figure 7:
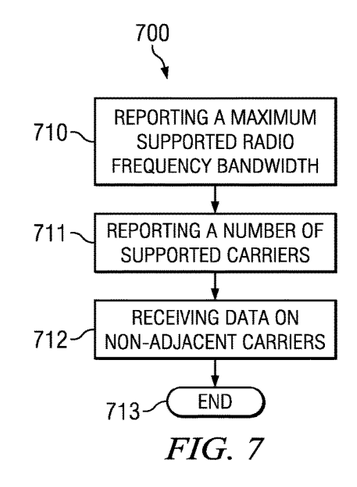
FIG. 7 is a flow diagram illustrating an example method for signaling and receiving data on non-adjacent carriers in accordance with an example embodiment of the invention.

FIG. 7 is a flow diagram illustrating an example method for signaling and receiving data on non-adjacent carriers in accordance with an example embodiment of the invention. Example method 700 may be performed by or in an apparatus, such as electronic device 100 of FIG. 1.

At block 710, the apparatus reports a maximum radio frequency bandwidth it supports. Reporting may comprise transmitting a report message, for example using an uplink.

At block 711, the apparatus reports a number of carriers it supports. Reporting may comprise transmitting a report message, for example using an uplink.

At block 712, the apparatus receives data on non-adjacent carriers. The data on non-adjacent carriers may be received via a downlink, for example.

In an example embodiment, the apparatus may further report a maximum gap size it supports between non-adjacent carriers. The example method 700 ends at block 713. The reporting in blocks 710 and 711 may be effected in a single message or in separate messages, depending on the embodiment. The number of supported carriers may also be reported before the maximum supported radio frequency bandwidth. The reporting and receiving of information illustrated in FIG. 7 may take place over a suitable control channel or channels, or alternatively over at least one data channel.

Figure 8:
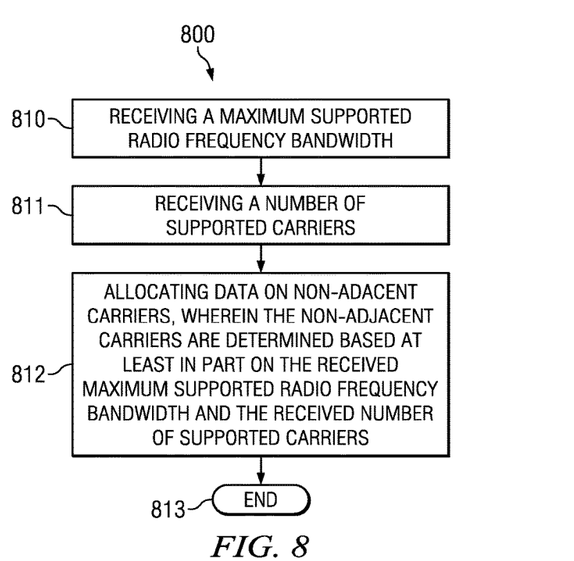
FIG. 8 is a flow diagram illustrating an example method for allocating data on non-adjacent carriers in accordance with an example embodiment of the invention.

FIG. 8 is a flow diagram illustrating an example method for allocating data on non-adjacent carriers in accordance with an example embodiment of the invention. Example method 800 may be performed by or in an apparatus, such as base station 220 of FIG. 2. The method may also be performed by or in other apparatuses, for example apparatuses comprised in a core network of a cellular network, or by a device comprised in a non-cellular network.

At block 810, the apparatus receives a maximum supported radio frequency bandwidth. The maximum supported radio frequency may be received via a message using uplink, for example.

At block 811, the apparatus receives a number of supported carriers. The number of supported carriers may be received via a message using uplink, for example.

At block 812, the apparatus allocates data on non-adjacent carriers. The allocation of data on non-adjacent carriers is determined based at least in part on the received maximum supported radio frequency bandwidth and the number of supported carriers. For example, in FIG. 3, when the received maximum supported radio frequency bandwidth is 15 MHz and the number of supported carriers is two, the apparatus may allocate data on non-adjacent carrier 1 and carrier 2, and the maximum gap size between carrier 1 and 2 is 5 MHz. In another example of FIG. 4, when the received maximum supported radio frequency bandwidth is 20 MHz and the number of supported carriers is two, the apparatus may allocate data on non-adjacent carrier 1 and carrier 2, and the maximum gap size between carrier 1 and 2 may be 10 MHz. In another example of FIG. 5, when the received maximum supported radio frequency bandwidth is 20 MHz and the number of supported carriers is three, data may be allocated on carriers 1 to carrier 3, where two of the carriers such as carrier 1 and carrier 2 may be non-adjacent and two carriers such as carrier 2 and carrier 3 are adjacent, and the maximum gap size between carrier 1 and 2 may be 10 MHz.

In an example embodiment, the apparatus may further receive a maximum supported gap size between non-adjacent carriers. The allocation of data on non-adjacent carriers is determined based at least in part on the received maximum supported radio frequency bandwidth and the number of supported carriers and the maximum supported gap size between non-adjacent carriers. For example, in FIG. 6, when the received maximum supported radio frequency bandwidth is 25 MHz, the number of supported carriers is three and the maximum gap size between non-adjacent carriers is 5 MHz, data may be allocated on carriers 1 to carrier 3, where carriers 1 to carrier 3 are non-adjacent, and the maximum gap size between any of the three carriers is 5 MHz.

The example method 800 ends at 813.

In an example embodiment, the maximum supported radio frequency bandwidth is reported in a capability field. For example in embodiments where connection 215 in FIG. 2 is in accordance with WCDMA technology, $3^{rd}$ generation partnership project, 3GPP, specifies a user terminal capability field. In the example embodiment of WCDMA technology, each user terminal signals its radio capabilities that include a list of supported frequency bands. For the supported frequency band, a user terminal may include an optional new "RF receiver bandwidth" information element, IE. The new information element may specify the value of maximum supported radio frequency bandwidth. The new information element may also indicate that a user terminal may work in non-adjacent carrier mode. A user terminal capability field is herein referred to as capability field, but it should be understood that in some embodiments, other name of the field may be used and such embodiments are not to be excluded from the scope of the present invention by this terminological choice.

TABLE 2

An example of reporting maximum supported radio frequency bandwidth

| Frequency band specific capability list | MP 1 . . . <maxFreq> | | | |
|---|---|---|---|---|
| >Frequency band | MP | Enumerated | | |
| >Frequency band 2 | OP | Enumerated | | Rel-6 |
| . . . | | | | |
| >RF receiver bandwidth | OP | Enumerated (15, 20) | UE maximum supported RF bandwidth measured in MHz | Rel-XX |

In an example embodiment, the apparatus 210 from FIG. 2 may further report a maximum supported gap size between non-adjacent carriers. An optional new "Maximum gap size" information element, IE, may be included in the capability field. The new information element may specify the value of maximum supported gap size between non-adjacent carriers.

TABLE 3

An example of reporting maximum supported radio frequency bandwidth and maximum supported gap size between non-adjacent carriers

| Frequency band specific capability list | MP 1 . . . <maxFreq> | | | |
|---|---|---|---|---|
| >Frequency band | MP | Enumerated | | |
| >Frequency band 2 | OP | Enumerated | | Rel-6 |
| . . . | | | | |
| >RF receiver bandwidth | OP | Enumerated (15, 20, 25) | UE receiver bandwidth measured in MHz | Rel-XX |
| >Maximum gap size | OP | Enumerated (5, 10, 15) | The maximum size of the gap between carriers measured in MHz. | Rel-XX |

In an example embodiment, the apparatus 210 of FIG. 2 may support multiple frequency bands. In an example embodiment, the apparatus 210 may report the maximum radio frequency bandwidth, the number of supported carriers and/or the maximum gap size for each supported frequency band.

Without in any way limiting the scope, interpretation, or application of the claims appearing below, a technical effect of one or more of the example embodiments disclosed herein may be enabling data allocation on non-adjacent carriers.

Embodiments of the present invention may be implemented in software, hardware, application logic or a combination of software, hardware and application logic. The software, application logic and/or hardware may reside on an electronic device or a personal key. If desired, part of the software, application logic and/or hardware may reside on an electronic device and part of the software, application logic and/or hardware may reside on a personal key. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium, for example a non-transitory computer-readable storage medium, that may be any media or means that can contain or store the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
    reporting a maximum radio frequency bandwidth supported by a user equipment in a capability field of at least one uplink report message to a base station, via a wireless connection;
    reporting, via a plurality of information elements in the capability field, a number of carriers within said maximum radio frequency bandwidth supported by the user equipment in said at least one uplink report message to the base station, each of said carriers being a portion of said maximum radio frequency bandwidth and having a corresponding one of an information element among the plurality of information elements, said carriers collectively not occupying all of said maximum radio frequency bandwidth, thereby creating at least one gap between carriers in said maximum radio frequency bandwidth, wherein each of the corresponding information elements has a corresponding carrier parameter and a collective quantity of the plurality of information elements indicates the number of carriers supported;
    reporting, via a maximum gap size information element in the capability field separate from the plurality of information elements, a maximum gap size between non-adjacent carriers to the base station, said non-adjacent carriers being those separated from one another by said at least one gap, wherein said maximum gap size is equal to a difference between the maximum radio frequency bandwidth and a sum of the bandwidths of the portions of the maximum frequency bandwidth occupied by said carriers; and
    receiving data in downlink from the base station on said non-adjacent carriers at the user equipment in accordance with the maximum radio frequency bandwidth, the number of carriers, and the maximum gap size reported to the base station,
    wherein the method is performed by the user equipment.

2. The method of claim 1, wherein reporting the maximum supported radio frequency bandwidth comprises reporting the maximum supported radio frequency bandwidth for each supported band.

3. The method of claim 1, wherein reporting a number of supported carriers comprises reporting a number of supported carriers for each supported band.

4. A method comprising:
    receiving at a base station in a capability field of at least one uplink report message a maximum radio frequency bandwidth supported by a user equipment, via a wireless connection;
    receiving, via a plurality of information elements in the capability field, at the base station a number of carriers within said maximum radio frequency bandwidth supported by the user equipment in said at least one uplink report message, each of said carriers being a portion of said maximum radio frequency bandwidth and having a corresponding one of an information element among the plurality of information elements, said carriers collectively not occupying all of said maximum radio frequency bandwidth, thereby creating at least one gap between carriers in said maximum radio frequency bandwidth, wherein each of the corresponding information elements has a corresponding carrier parameter and a collective quantity of the plurality of information elements indicates the number of carriers supported;
    receiving, via a maximum gap size information element in the capability field separate from the plurality of information elements, at the base station a maximum gap size between non-adjacent carriers from the user equipment, said non-adjacent carriers being those separated from one another by said at least one gap, wherein said maximum gap size is equal to a difference between the maximum radio frequency bandwidth and a sum of the bandwidths of the portions of the maximum frequency bandwidth occupied by said carriers;
    allocating data on said non-adjacent carriers for a downlink transmission to the user equipment, wherein the non-adjacent carriers are determined based at least in part on the received maximum radio frequency bandwidth supported by the user equipment, the received number of carriers supported by the user equipment, and the maximum gap size; and
    sending the data to the user equipment on the non-adjacent carriers in the downlink transmission,
    wherein the method is performed by the base station.

5. The method of claim 4, wherein the non-adjacent carriers are further determined based at least in part on the received maximum supported radio frequency bandwidth and the received number of supported carriers and the received maximum gap size between non-adjacent carriers.

6. The method of claim 4, wherein receiving a maximum supported radio frequency bandwidth comprises receiving the maximum supported radio frequency bandwidth for each supported band.

7. The method of claim 4, wherein receiving a number of supported carriers comprises receiving a number of supported carriers for each supported band.

8. An apparatus comprising:
at least one processor; and
at least one memory including computer program code, wherein the at least one memory and the computer program code are configured, with the at least one processor, to cause the apparatus to perform at least the following:
report a maximum radio frequency bandwidth supported by the apparatus in a capability field of at least one uplink report message to a base station, via a wireless connection;
report, via a plurality of information elements in the capability field, a number of carriers within said maximum radio frequency bandwidth supported by the apparatus in said at least one uplink report message to the base station, each of said carriers being a portion of said maximum radio frequency bandwidth and having a corresponding one of an information element among the plurality of information elements, said carriers collectively not occupying all of said maximum radio frequency bandwidth, thereby creating at least one gap between carriers in said maximum radio frequency bandwidth, wherein each of the corresponding information elements has a corresponding carrier parameter and a collective quantity of the plurality of information elements indicates the number of carriers supported;
report, via a maximum gap size information element in the capability field separate from the plurality of information elements, a maximum gap size between non-adjacent carriers to the base station, said non-adjacent carriers being those separated from one another by said at least one gap, wherein said maximum gap size is equal to a difference between the maximum radio frequency bandwidth and a sum of the bandwidths of the portions of the maximum frequency bandwidth occupied by said carriers; and
receive data in downlink from the base station on said non-adjacent carriers at the apparatus in accordance with the maximum radio frequency bandwidth, the number of carriers, and the maximum gap size reported to the base station,
wherein the apparatus is a user equipment.

9. The apparatus of claim 8, wherein reporting the maximum supported radio frequency bandwidth comprises reporting the maximum supported radio frequency bandwidth for each supported band.

10. The apparatus of claim 8, wherein reporting a number of supported carriers comprises reporting a number of supported carriers for each supported band.

11. An apparatus comprising:
at least one processor; and
at least one memory including computer program code, wherein the at least one memory and the computer program code are configured, with the at least one processor, to cause the apparatus to perform at least the following:
receive at the apparatus in a capability field of at least one uplink report message a maximum radio frequency bandwidth supported by a user equipment, via a wireless connection;
receive, via a plurality of information elements in the capability field, at the apparatus a number of carriers within said maximum radio frequency bandwidth supported by the user equipment in said at least one uplink report message, each of said carriers being a portion of said maximum radio frequency bandwidth and having a corresponding one of an information element among the plurality of information elements, said carriers collectively not occupying all of said maximum radio frequency bandwidth, thereby creating at least one gap between carriers in said maximum radio frequency bandwidth, wherein each of the corresponding information elements has a corresponding carrier parameter and a collective quantity of the plurality of information elements indicates the number of carriers supported;
receive, via a maximum gap size information element in the capability field separate from the plurality of information elements, at the apparatus a maximum gap size between non-adjacent carriers from the user equipment, said non-adjacent carriers being those separated from one another by said at least one gap, wherein said maximum gap size is equal to a difference between the maximum radio frequency bandwidth and a sum of the bandwidths of the portions of the maximum frequency bandwidth occupied by said carriers;
allocate data on said non-adjacent carriers for a downlink transmission to the user equipment, wherein the non-adjacent carriers are determined based at least in part on the received maximum radio frequency bandwidth supported by the user equipment, the received number of carriers supported by the user equipment, and the maximum gap size; and
send the data to the user equipment on the non-adjacent carriers in the downlink transmission,
wherein the apparatus is a base station.

12. The apparatus of claim 11, wherein the non-adjacent carriers are further determined based at least in part on the received maximum supported radio frequency bandwidth and the received number of supported carriers and the received maximum gap size between non-adjacent carriers.

13. The apparatus of claim 11, wherein receiving a maximum supported radio frequency bandwidth comprises receiving the maximum supported radio frequency bandwidth for each supported band.

14. The apparatus of claim 11, wherein receiving a number of supported carriers comprises receiving a number of supported carriers for each supported band.

15. A computer program product comprising a non-transitory computer-readable storage medium bearing computer program code embodied therein for use with a computer, the computer program code comprising code for performing the following:
reporting a maximum radio frequency bandwidth supported by a user equipment in a capability field of at least one uplink report message to a base station, via a wireless connection;
reporting, via a plurality of information elements in the capability field, a number of carriers within said maximum radio frequency bandwidth supported by the user equipment in said at least one uplink report message to the base station, each of said carriers being a portion of said maximum radio frequency bandwidth and having a corresponding one of an information element among the plurality of information elements, said carriers collectively not occupying all of said maximum radio frequency bandwidth, thereby creating at least one gap between carriers in said maximum radio frequency bandwidth, wherein each of the corresponding information elements has a corresponding carrier parameter and a collective quantity of the plurality of information elements indicates the number of carriers supported;
reporting, via a maximum gap size information element in the capability field separate from the plurality of information elements, a maximum gap size between non-adjacent carriers to the base station, said non-adjacent carriers being those separated from one another by said at least one gap, wherein said maximum gap size is equal to a difference between the maximum radio frequency bandwidth and a sum of the bandwidths of the portions of the maximum frequency bandwidth occupied by said carriers; and receiving data in downlink from the base station on said non-adjacent carriers at the user equipment in accordance with the maximum radio frequency bandwidth, the number of carriers, and the maximum gap size reported to the base station.

16. The computer program product of claim 15, wherein reporting the maximum supported radio frequency bandwidth comprises reporting the maximum supported radio frequency bandwidth for each supported band.

17. The computer program product of claim 15, wherein reporting a number of supported carriers comprises reporting a number of supported carriers for each supported band.

18. A computer program product comprising a non-transitory computer-readable medium bearing computer program code embodied therein for use with a computer, the computer program code comprising code for performing the following:

receiving at a base station in a capability field of at least one uplink report message a maximum radio frequency bandwidth supported by a user equipment, via a wireless connection;

receiving, via a plurality of information elements in the capability field, at the base station a number of carriers within said maximum radio frequency bandwidth supported by the user equipment in said at least one uplink report message, each of said carriers being a portion of said maximum radio frequency bandwidth and having a corresponding one of an information element among the plurality of information elements, said carriers collectively not occupying all of said maximum radio frequency bandwidth, thereby creating at least one gap between carriers in said maximum radio frequency bandwidth, wherein each of the corresponding information elements has a corresponding carrier parameter and a collective quantity of the plurality of information elements indicates the number of carriers supported;

receiving, via a maximum gap size information element in the capability field separate from the plurality of information elements, at the base station a maximum gap size between non-adjacent carriers from the user equipment, said non-adjacent carriers being those separated from one another by said at least one gap, wherein said maximum gap size is equal to a difference between the maximum radio frequency bandwidth and a sum of the bandwidths of the portions of the maximum frequency bandwidth occupied by said carriers;

allocating data on said non-adjacent carriers for a downlink transmission to the user equipment, wherein the non-adjacent carriers are determined based at least in part on the received maximum radio frequency bandwidth supported by the user equipment, the received number of carriers supported by the user equipment, and the maximum gap size; and sending the data to the user equipment on the non-adjacent carriers in the downlink transmission.

19. The computer program product of claim 18, wherein the non-adjacent carriers are further determined based at least in part on the received maximum supported radio frequency bandwidth and the received number of supported carriers and the received maximum gap size between non-adjacent carriers.

20. The computer program product of claim 18, wherein receiving a maximum supported radio frequency bandwidth comprises receiving the maximum supported radio frequency bandwidth for each supported band.

21. The computer program product of claim 18, wherein receiving a number of supported carriers comprises receiving a number of supported carriers for each supported band.

* * * * *